Dec. 28, 1965    P. AUTIO    3,225,371
WASHER DETECTOR FOR SCREW AND WASHER ASSEMBLY MACHINE
Filed Nov. 4, 1963    2 Sheets-Sheet 1
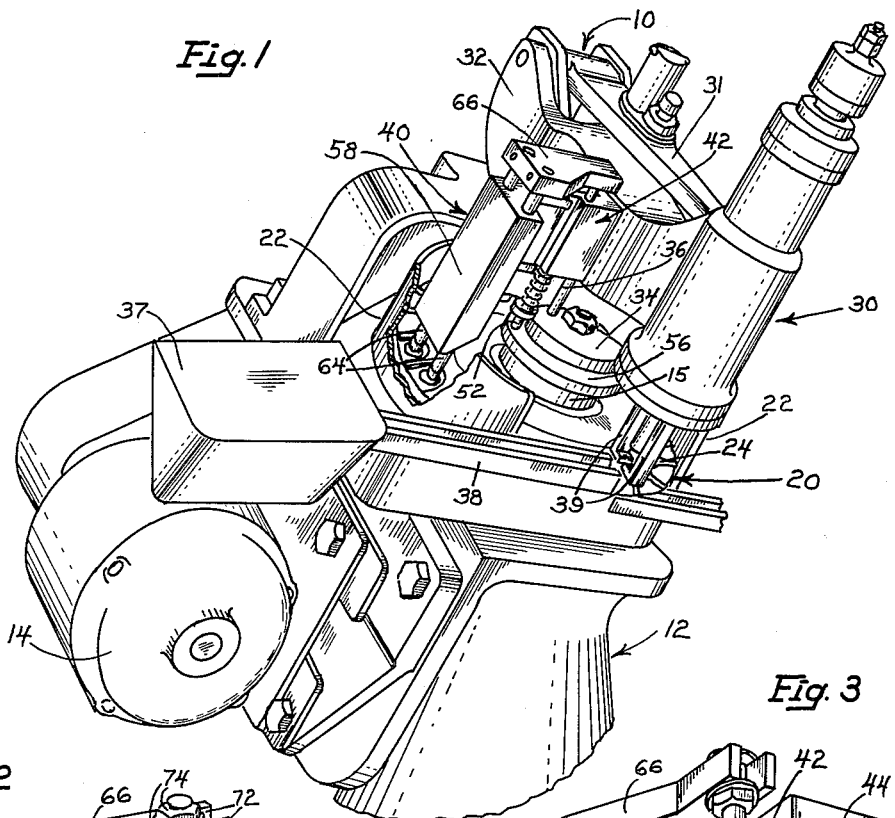
Fig. 1
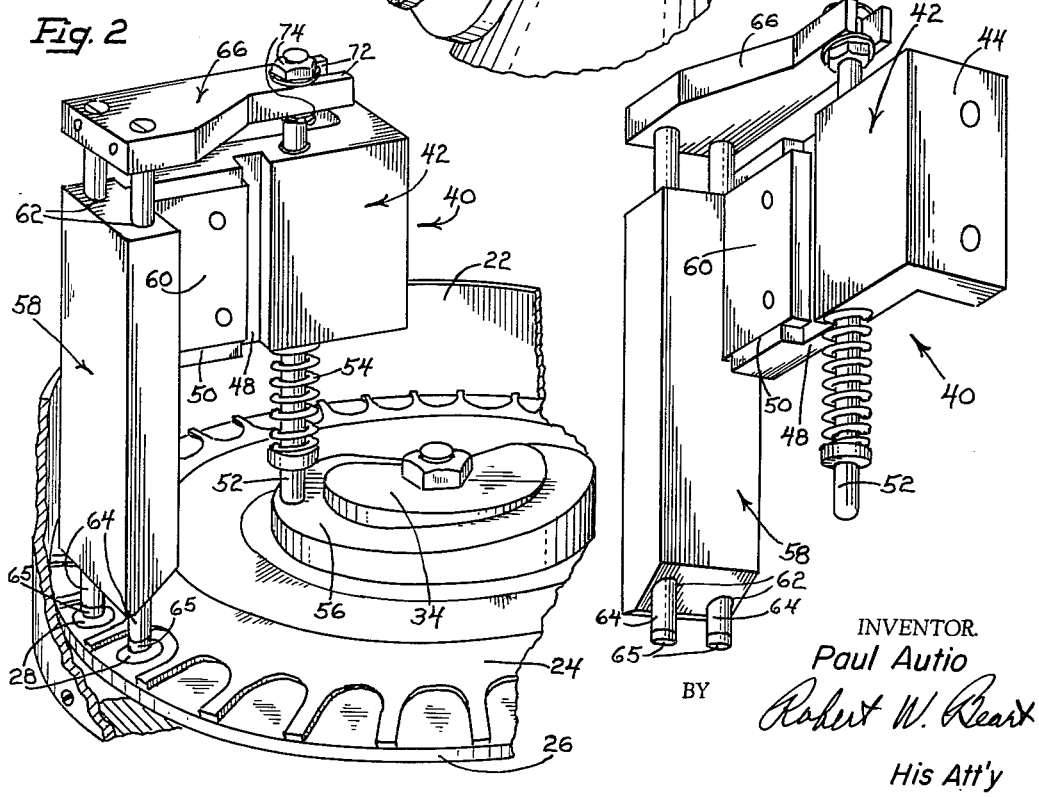
Fig. 2
Fig. 3
INVENTOR.
Paul Autio
BY
Robert W. Beart
His Att'y Dec. 28, 1965     P. AUTIO     3,225,371
WASHER DETECTOR FOR SCREW AND WASHER ASSEMBLY MACHINE
Filed Nov. 4, 1963     2 Sheets-Sheet 2
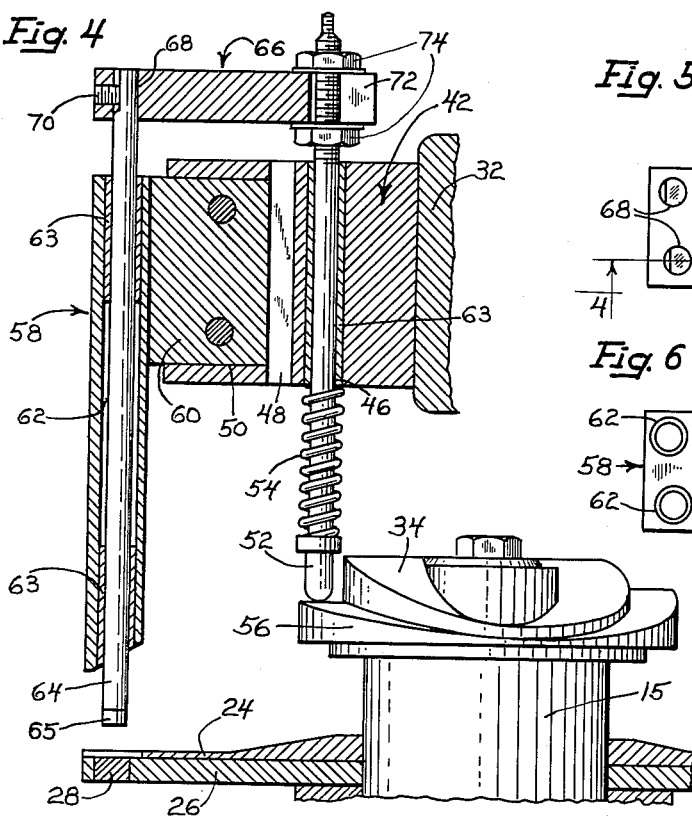
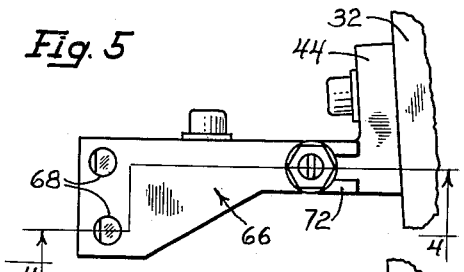
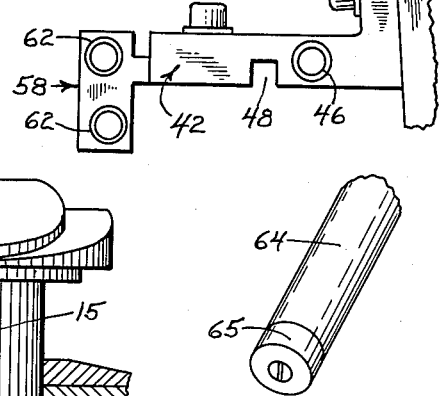
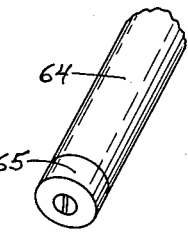
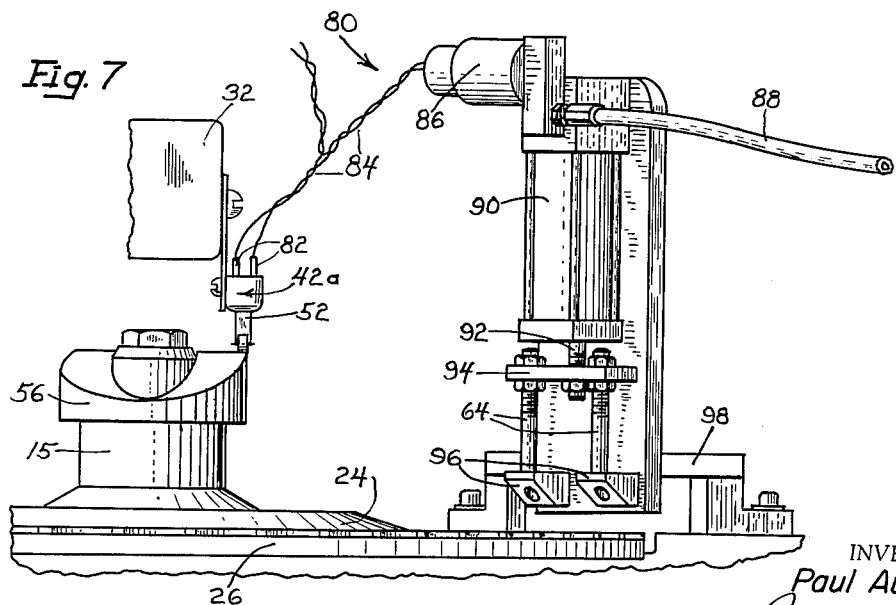
INVENTOR.
Paul Autio
BY Robert W. Beart
His Att'y United States Patent Office 3,225,371
Patented Dec. 28, 1965

3,225,371
WASHER DETECTOR FOR SCREW AND WASHER ASSEMBLY MACHINE
Paul Autio, Elgin, Ill., assignor to Illinois Tool Works Inc., Chicago, Ill., a corporation of Delaware
Filed Nov. 4, 1963, Ser. No. 321,128
21 Claims. (Cl. 10—155)

The invention relates to an attachment for a fastener and washer assembly machine, and more particularly, to a washer detecting mechanism which insures the assembly of a single washer to a screw blank.

Screw and washer assembly machines have been developed to provide for the feeding of the washers and screw blanks to an assembly station where the washers and screw blanks are assembled to one another, and where the assembled fastener may thereafter be fed to a thread rolling device which forms thread in the screw blanks of such a magnitude so as to provide for the retention of the washer on the screw. One of the difficulties that has been encountered with such a machine is that the washer feeding means has a tendency to feed superimposed washers to the assembly station and cause the production of a fastener having two or more washers associated with the screw. This is particularly the case where thin and wavy washers are used. The difficulty of selecting and feeding single washers to the assembly station of such machines has been overcome by the present invention in the provision of a washer detecting and removal means which detects the presence or absence of superimposed washers, and which thereafter functions in response to the detected presence of such superimposed washers to remove the uppermost superimposed washer from the washer feeding means.

It is, therefore, an object of the present invention to provide a washer detecting and removal mechanism for the washer feeding means in a screw and washer assembly machine to insure the assembly of a single washer to a screw blank.

Another object of the present invention is the provision of a method and apparatus detecting the presence or absence of superimposed washers positioned within a washer feeding means, causing the removal of excess washers therefrom, and returning such washers to their initial position for refeeding by the washer feeding means.

A further object of the present invention is the provision of a washer detecting and removal mechanism for a washer feeding means in a screw and washer assembly machine which may be readily attached to and incorporated within known and existing machines.

Still another object of the present invention is the provision of a washer detecting and removal mechanism for a screw and washer assembly machine which is easily mounted to such a machine, and may be either mechanically, hydraulically or pneumatically actuated to provide for the removal of excess washers from the washer feeding means.

Another object of the present invention is to provide a washer detecting and removal mechanism which is adjustable relative to the washer feeding means in a screw and washer assembly machine to accommodate a washer feeding means which can retain a different amount of washers therewithin.

Still a further object of the present invention is the provision of a washer detecting and removal mechanism which improves the efficiency and operation of the screw and washer assembly machine by improving the operation of the washer feeding means.

Other objects and advantages of the present invention will become apparent from the following description and the accompanying drawings wherein:

FIG. 1 is a perspective view of a screw and washer assembly machine incorporating the washer detecting and removal mechanism of the present invention;

FIG. 2 is an enlarged fragmentary perspective view of the washer detecting and removal mechanism as associated with the washer feeding means;

FIG. 3 is an enlarged perspective view of the washer detecting and removal mechanism as viewed from an angle different than that of FIG. 2;

FIG. 4 is an enlarged fragmentary cross sectional view of the washer detecting and removal mechanism;

FIG. 5 is a top plan view of the interconnecting bridge portion of the washer detecting and removal mechanism;

FIG. 6 is a fragmentary top plan view of the bracket and rod holder of the washer detecting and removal mechanism with the interconnecting bridge portion removed therefrom;

FIG. 7 is a side elevational view relating to a second embodiment of the washer detecting and removal mechanism;

FIG. 8 is an enlarged fragmentary perspective view of the lower portion of a rod with a magnet secured thereto.

Referring now more specifically to the drawings, wherein like parts are designated by the same numerals throughout the various figures, there is shown in FIG. 1 a screw and washer assembly machine 10 of standard type, such as that shown for example in the Patent to O. J. Poupitch 2,343,798 dated March 7, 1944. The screw and washer assembly machine 10 is adapted to be mounted on the frame 12 of a screw thread rolling machine which threads the screws after they have been telescopingly assembled to the washer by the various mechanisms of the screw and washer assembly machine for producing permanently assembled screw and washer units. The operation of the various mechanisms of the machine is shown and described in the aforesaid Poupitch patent; however, in order to understand the functioning and relationship of the present invention with respect to such mechanisms, the general operation of the machine will be described.

The screw and washer assembly machine 10 generally comprises a washer feeding means 20 and a screw blank transfer mechanism 30 as shown in FIG. 1, both of which are inclined at an angle of approximately 30° to the horizontal. The washer feeding means 20 has a hopper shell 22 into which the washers are received, a washer feeding disc 24, and a washer support ring 26 which underiles the washer feeding disc 24 and supports the washers located within the plurality of notches formed in the washer feeding disc. When the washers are positioned within the hopper shell 22, they rest against the forward and lower portion of the wall of the hopper shell due to the inclination of the machine, and lie on the top surface of the washer feeding disc 24 and that portion of the washer support ring 26 which supports the washers in the notches of the washer feeding disc. From this position, the washers are received and carried by the plurality of notches formed in the washer feeding disc 24 to an assembly station where the screw blank transfer mechanism 30 is located. As the washers are being fed toward the assembly station, screw blanks received within the hopper 37 are positioned on chute 38 and are gravitationally accelerated toward the screw blank transfer mechanism 30 where they are individually gripped and telescopingly assembled by the gripping and assembling mechanism 39 to a washer located at the assembly station. The screw blank can then be fed to the thread rolling dies where the threads are formed which retain the washer to the screw.

The motor 14 of the machine drives both the washer feeding disc 24 and the screw blank transfer mechanism 30, the former being driven in step by step movement toward the assembly station. Intermittent movement of the washer feeding disc 24 is accomplished by a cam and indexing mechanism (not shown) operating through the driving mechanism 14 to drive shaft assembly 15 and the attached washer feeding disc 24 in a counterclockwise direction toward the assembly station a distance for each movement which corresponds to the distance between successive washer receiving notches of the washer feeding disc 24. The shaft assembly 15 also drives cam 34 and cam follower 36, the latter being interconnected to the screw blank transfer mechanism 30 to set the same in motion when actuated by the cam 34. The functioning of the driving mechanism is such that for each revolution of the washer feeding disc cam (not shown), the cam 34 also makes a single revolution to cause the screw blank transfer mechanism 30 to complete one cycle of movement for each interrupted movement of the washer feeding disc 24. The top surface of cam 34 has been designed to permit the downward movement of the screw blank transfer mechanism 30 to occur when the washer feeding disc 24 is stationary. As the screw blank transfer mechanism 30 moves from its upper to its lower position, a screw blank is gripped and telescoped within a washer to provide the first step of the permanent assembly of the components, the second and final being completed when the threads are rolled on the screw blank.

The present invention is structurally interrelated to the screw blank transfer mechanism 30 and associated with the washer feeding disc 24 to improve the efficiency and operation of the machine as a whole. This has been done by providing an effective means which supplies one washer per notch in the washer feeding disc 24. As has been previously discussed, thin and wavy washers are very difficult to select with present washer scrapers or detectors as they tend to remain positioned in superimposed relation to one another. Prior art proposals have contemplated washer feeding discs of very thin construction to receive only a single washer or provide wiper strips mounted to the hopper shell and resting on the washer feeding disc for engaging and removing a washer superimposed on the washer received within the notches of the washer feeding disc. The difficulty with such prior art solutions is that the washer feeding disc will have many empty cavities preventing the assembly of a screw blank to a washer within each washer feeding cycle of the machine, and there is no assurance that only the uppermost superimposed washer will be removed by present removal devices. As will readily appear hereinafter, the present invention as illustrated operates on the principle of separating superimposed washers by bringing them into the influence of opposed magnetic fields. It is to be understood that the invention is not limited to this principle as other means may be employed to accomplish this result as will readily appear from the following discussion.

According to the present invention, a washer detecting and removal mechanism is provided for removing the uppermost washer from a pair of superimposed washers located within the washer feeding discs, and for returning such washer to the mass of washers positioned within the hopper shell of the washer feeding means.

One illustrative embodiment of the invention is shown in FIGS. 1–6 and is generally designated by the numeral 40. The washer detecting and removal mechanism 40 has a bracket 42 which is attached to the screw blank transfer mechanism body 32 by way of flange 44 as is shown in FIG. 6 of the drawings. The gripping and assembling mechanism 39 of the screw blank transfer mechanism 30 performs its functions through operating lever 31 when the latter is oscillated by cam 34 and cam follower 36 while screw blank transfer mechanism body 32 remains stationary. As a result, the bracket 42 of the washer detecting and removal mechanism will likewise remain stationary during the cycle of the screw blank transfer mechanism 30. At the other end of the bracket 42, there is provided a slot 50 for receiving the arm 60 of the magnetic rod holder 58. Extending transversely to the slot 50 is a groove 48 which permits the arm 60 of the rod holder 58 to slide within the slot 50 and groove 48 for adjustment purposes. Elliptical openings on the side of the bracket opposite the groove 48 and slot 50 receive fasteners for adjustably mounting the arm 60 within the slot 50. In this manner, the washer detecting and removal mechanism 40 can be adjusted to accommodate different-sized washer feeding discs.

Received within the bores 62 of the rod holder 58 are a pair of slidably mounted rods 64 having magnets 65 attached to their lower ends. The magnetic lines of flux that are created about the magnets 65 will attract the uppermost washer of a pair of superimposed washers when the magnetic field is brought into proximity with the washer feeding disc. In order to locate the rods 64 and magnets 65 near the washers received within the washer feeding disc 24, the washer detecting and removal mechanism 40 is provided with a cam follower 52 which is slidably mounted within the bore 46 of the bracket 42 for reciprocatory movement when actuated by the cam 56 of the washer detecting and removal mechanism. The cam 56 surrounds the screw blank transfer mechanism cam 34 as shown in FIG. 2, and is related to the washer feeding means and the screw blank transfer mechanism so that it revolves with the shaft assembly 15 when driven by the motor 14. Cam follower 52 is held into engagement with the top surface of the cam 56 by the encircling spring 54, and is associated at its opposite end with the rods 64 by the interconnecting bridge 66. The movement of the rods 64 through the interconnecting bridge 66 and cam follower 52 is so timed with respect to the other parts of the machine that it occurs when the washer feeding disc is stationary. The upper surface of the cam 56 is thus designed to permit the movement of the rods 64 to occur at this time.

As best shown in FIGS. 2–4, the interconnecting bridge 66 is securely mounted to the upper portions of the rod 64 and cam follower 52 to permit reciprocatory movement of the rods through the cam follower at the proper instant. The bridge 66 is provided at one end with a bifurcated portion 72 for receiving the upper portion of the cam follower which is securely attached to the bridge by way of fasteners 74. The other end of the bridge 66 receives the upper portions of the rods 64 which is flat machined at that point, and which is engaged by set screws 70 to prevent rotative movement of the rods 64. The manner of attaching the rods and cam follower to the bridge 64 can be accomplished by other equivalent means, or if desired, the cam follower bridge and rods can be made as a single unitary part.

When the rod 64 approach the notches of the washer feeding disc 24, they will actually detect the presence or absence of a pair of superimposed washers in each notch through the field generated by magnets 65, and operate to remove the uppermost superimposed washer when the field overcomes the gravitational force exerted on the washers. The magnets 65 might possibly attract all the washers carried within each of the notches of the washer feeding disc 24 were it not for the fact that the washer support ring 26, which underlies the washer feeding disc, is provided with a pair of magnets 28 located directly below the moving magnetic rods. Magnets 28 are received within a brass or other nonmagnetic washer support ring to concentrate the lines of force of these magnets.

The relative position of the lowermost washer of a pair of superimposed washers is such that it will be closer to the magnets 28 than to the moving magnets 65, and will, therefore, be retained in the notches of the washer feeding disc 24. Proper selection of the lower magnets is important in that the magnetic lines of flux must be parallel to the direction of the washer travel, that is, parallel to the flat washer feeding disc surface. Magnets with lines of flux perpendicular to the washer feeding disc will cause the washers to stand on their edge in alignment with the lines of flux and then, after passing beyond the magnets, will fall out of the washer feeding disc notches.

In order to facilitate the removal of the washers attracted by the magnets 65 on the upward movement of the rods, brass sleeves 63 are inserted with the bores 62 of the rod holder 58 and serve as rod bearings as well as a nonmagnetic part in aiding the stripping of the washers from the magnets by the rod holder 58. The lower portions of the rod holders 58 are also inclined, and this has facilitated the stripping of the washers from the magnets 65. The spring 54, which retains the cam follower 52 in engagement with the upper surface of the cam 56, also acts as a biasing means to hold the bracket and rod holder in a position which is spaced upwardly from the ends of the rods 64 where the magnets 65 are attached.

The operation of the washer detecting and removal mechanism 40 in conjunction with the other elements of the machine is as follows: Washers from the mass of washers positioned within the hopper shell 22 fall into the notches of the washer feeding disc 24 and rest upon the top surface of the ring 26 along which they are moved in intermittent fashion toward the assembly station where the screw blank transfer mechanism 30 is located. Any superimposed washers positioned within the washer feeding disc 24, due to the thickness of the washer feeding disc or otherwise, will be removed by the washer detecting and removal mechanism 40. The cam 56 is rotated by the shaft assembly 15, and operates in accordance with the cycle of the machine to actuate the cam follower 52 and the rods 64 which are interconnected therewith through bridge 66 to reciprocate the same when the washer feeding disc 24 is stationary. The lowermost washer of the pair of superimposed washers, which is carried within the notches of the washer feeding disc, is attracted by the magnets 28 to retain a single washer within each of the notches of the washer feeding disc. Since the uppermost superimposed washers are positioned nearer the magnets 65 than the magnets 28, they will be attracted by the magnets 65 and carried by the rods 64 away from the other washer. Continued upward movement of the rods 64 will force the washers against the inclined surface of the rod holder 58 and strip the washers from the rods so that they fall back to the mass of washers positioned within the hopper shell. The washers remaining in the washer feeding disc 24 are fed in successive steps toward the assembly station where they are united to a screw blank which has been gripped and applied thereto by the assembly 39 of the screw blank transfer mechanism 30. After this assembly operation, the united parts will be fed to a thread rolling device which will form threads in the screw blank to retain the washer thereto.

It is to be noted that the washer detecting and removal device 40 has been illustrated with a plurality of rods 64, and this has been done to point out the fact that if the first rod should fail due to dirt or some other reason, the second rod will remove the uppermost superimposed washer. The use of a plurality of rods carried within the rod holder is also effective when there are three or more washers in the cavity or notches of the washer feeding disc. In such a case, the first rod will remove the upper washer, and the second rod will remove the intermediate positioned washer.

Another embodiment of the invention is shown in FIG. 7 as comprising an electro-pneumatic washer detecting and removal mechanism which is designated by the numeral 80. This embodiment is also provided with a cam 56, which is rotated by the shaft assembly 15, and the cam follower 52. The cam follower 52 is adapted to be slidably received within the bracket 42a, which in turn, is attached to the screw blank transfer mechanism body 32. As the cam follower 52 goes through its movement, it will actuate limit switches 82 to complete a circuit through leads 84 for operating a solenoid actuated control valve 86. Air introduced through supply line 88 will be forced into the cylinder of the fluid motor 90 to drive the piston and piston rod in a downward motion. The piston rod 92 of the fluid motor 90 is attached to the rod plate 94 for reciprocating the rods 64 into close proximity to the washers received within the notches of the washer feeding disc 24.

If there should be a pair of superimposed washers carried within the washer feeding disc 24, the rods 64 and their associated magnets 65 will attract the uppermost superimposed washers in the same manner as the FIGS. 1-6 embodiment to remove them from the washer feeding disc. The washer support ring 26 will carry suitable magnets to retain the lowermost washer within the notches of the washer feeding disc. Stripper blocks 96, with their inclined lower surfaces, are mounted on the fluid motor support 98 to aid in stripping the washers from the rods. Washers stripped from the rods 64 will return to the mass of washers positioned within the hopper shell and will thereafter be refed by the washer feeding disc. A hydraulic circuit may be used in place of the electro-pneumatic circuit of FIG. 7 if desired.

From the foregoing, it will be evident that the present invention provides a washer detecting and removal mechanism which may be associated with a standard screw and washer assembly machine to improve its efficiency and operation. The washer feeding disc may be made of sufficient thickness to facilitate easy and positive loading of washers within notches of the washer feeding disc, and even though the washers may tend to become stacked upon one another, the washer detecting and removal mechanism will operate in a positive manner to remove the excess washers from the notches of the washer feeding disc and return such washers for refeeding purposes. The retention of only a single washer within each notch of the washer feeding disc by the washer detecting removal mechanism also insures that only a single washer will be assembled to each screw blank to improve the production capacity of the machine.

Instead of using magnets, other attracting means such as a pressure sensitive adhesive or mechanical gripping means may be used to insure the removal of excess washers and the retention of a single washer within each of the notches of the washer feeding disc. Where magnets are used, they will normally be of the permanent variety although electromagnets and other types of magnetic field creating devices are also suitable. Further, indexing mechanisms for the washer feeding means having a smooth acceleration and deceleration may be used with the present invention if desired.

While the preferred embodiments of the present invention have been shown and described herein, it is obvious that many structural details may be changed without departing from the spirit and scope of the appended claims.

I claim:

1. In a machine for assembling fastener and washer elements, washer feeding means for retaining a plurality of washer elements and for feeding said washer elements to a predetermined point, means for feeding fastener elements into telescoping relationship with said washer elements at said predetermined point, and means for attracting and removing excess washer elements from said washer feeding means in a direction substantially normal to the plane in which said disc is carrying said washers being fed to said predetermined point whereby to insure the assembly of a single washer element to each fastener element.

2. Apparatus for assembling fasteners with washers comprising a washer feeding disc having means for carrying washers in a plurality of spaced-apart locations to a predetermined point, means for effecting axial telescoping movement of said fasteners into said washers at said predetermined point, and means for detecting and attracting excess washers from said washer feeding disc in a direction substantially normal to the plane in which said disc is carrying said washers prior to arrival of said excess washers at said predetermined point while retaining a single washer at each of said spaced-apart locations.

3. Apparatus for assembling fasteners with washers comprising a washer feeding disc having means for carrying washers in a plurality of spaced-apart locations to an assembly station means located at said assembly station for effecting axial telescoping movement of said fasteners into said washers, and magnetic means for detecting and removing excess washers from said washer feeding disc prior to arrival at the assembly station while retaining a single washer at each of said spaced-apart locations.

4. Apparatus for assembling fasteners with washers comprising an intermittently moving washer feeding disc having means thereon for carrying washers in spaced relationship to an assembly station, means located at the assembly station for effecting axial telescoping movement of said fasteners into said washers while said washer feeding disc is stationary, and means in advance of the assembly station for attracting and removing excess washers from said washer feeding disc while said disc is stationary.

5. In a machine for feeding fastener and washer elements to a predetermined point and for assembling said fastener elements to said washer elements at said point, means for retaining a plurality of washer elements and for intermittently moving said washer elements toward said predetermined point, and magnetic means for detecting and removing excess washers from said washer retaining means when held in stationary position.

6. In a device for conveying washer elements in a plurality of spaced-apart locations, means for attracting and removing excess superimposed washer elements positioned at said spaced-apart locations in a direction substantially normal to the plane in which said washer elements are being conveyed, and means for attracting and retaining a single washer element at each of said spaced-apart locations.

7. In a device for conveying washer elements in a plurality of spaced-apart locations, a first magnetic means for attracting and removing excess superimposed washer elements positioned at said spaced-apart locations, and a second magnetic means for attracting and retaining a single washer element at each of said spaced-apart locations.

8. The device set forth by claim 7 wherein said second magnetic means is positioned opposite to said first magnetic means.

9. A washer detecting and removal mechanism for use with an intermittently operable washer feeding disc having means thereon for carrying a plurality of washers in spaced predetermined relationship, comprising magnetic means for detecting the presence of excess washers within said washer feeding disc, and means for removing the excess washers from said washer feeding disc, both of said means operating when said washer feeding disc is stationary.

10. Apparatus for assembling fasteners with washers comprising a washer container, washer feeding means including a rotary disc positioned within said container and having means thereon for carrying a plurality of washers in spaced relationship to a predetermined point, means for feeding said fasteners to said predetermined point, a fastener transfer mechanism for gripping and assembling said fasteners into said washers at said predetermined point, and means for attracting and removing excess washers from said rotary disc prior to arrival at said predetermined point while retaining single washers in spaced relationship on said rotary disc, said means for attracting and removing of excess washers acting in a direction substantially normal to the plane of rotation of said rotary disc.

11. The apparatus set forth by claim 10 wherein said last mentioned means comprises a bracket mounted on said fastener transfer mechanism, a cam follower slidably received by said bracket and adapted to be actuated by a rotary cam means, a rod holder associated with said bracket and carrying a plurality of rods having magnets attached to their lower ends, a bridge interconnecting said cam follower and said rods for causing said rods to reciprocate in unison with said cam follower, and a washer support ring underlying said rotary disc and having magnets aligned with said rod magnets for retaining the single washers on said disc as the excess washers are removed by said rod magnets and stripped from said rods by the rod holder.

12. The apparatus set forth by claim 11 wherein said rod holder is adjustably mounted to said bracket.

13. The apparatus set forth by claim 11 wherein the rods are received within non-magnetic sleeves positioned within said rod holder to facilitate the stripping of washers carried by the rods.

14. The apparatus set forth by claim 11 wherein the lower portion of said rod holder has an inclined surface to facilitate the stripping of washers carried by said rods.

15. Apparatus for assembling fasteners with washers comprising a washer container, washer feeding means including a rotary disc positioned within said container and having means thereon for carrying washers at a plurality of spaced-apart locations to an assembly station, a washer support ring underlying said rotary disc for supporting said washers in substantially coplanar relationship, said washer support ring having a plurality of magnets mounted thereon at a predetermined position to underlie a corresponding plurality of washers, a fastener container, means for feeding said fasteners to said assembly station, a fastener transfer mechanism located at said assembly station for gripping and telescoping said fasteners into said washers, and means for detecting and removing excess washers from said rotary disc prior to arrival at said assembly station, said last mentioned means comprising a bracket mounted on said fastener transfer mechanism, a spring mounted cam follower slidably mounted on said bracket and adapted to be actuated by a rotary cam means positioned within said washer container, a rod holder detachably associated to said bracket, a plurality of rods slidably received by said rod holder and having magnets attached to the lower ends of said rods, a bridge interconnecting said cam follower and said rods permitting said rods to be reciprocated by said cam follower when said rotary cam actuates said cam follower, said rod magnets attracting excess washers carried by said rotary disc when said rods are in their lowermost position while said washer support ring magnets attract and retain single washers at said spaced-apart locations of said rotary disc, the excess washers carried by said rods being stripped therefrom by said rod holder when said rods are moved toward their uppermost position.

16. Apparatus for assembling fasteners with washers comprising a washer feeding disc having means for carrying washers in spaced relationship to a predetermined point, means for effecting axial telescoping movement of said fasteners into said washers at said predetermined point, and means for detecting and removing excess washers from said washer feeding disc including a cam follower and cam means, a plurality of rods having magnets at their lower ends for attracting superimposed washers carried by said rotary disc, and pneumatically actuatable driving means associated with said cam follower and rods and adapted to operate in response to the movement of said cam follower for causing said rods to be reciprocated in proximity to said washer feeding disc for removing superimposed washers therefrom.

17. The apparatus set forth in claim 16 wherein the cam follower actuates a limit switch to complete a circuit through a solenoid actuated control valve to admit fluid to said pneumatically actuable driving means and set said driving means in motion.

18. The apparatus set forth by claim 16 wherein washer stripper blocks are mounted adjacent to said rods to strip washers therefrom when said rods are moved upwardly.

19. The apparatus set forth by claim 16 wherein a washer support ring underlies said washer feeding disc and is provided with a plurality of magnets in opposition to said rod magnets for retaining single washers in spaced relationship around said washer feeding disc.

20. The method of feeding a plurality of washers carried by a washer feeding means in spaced apart successive movements to a predetermined point comprising the steps of positioning said washers within said washer feeding means, driving said washer feeding means to carry said washers to said predetermined point, detecting the presence or absence of superimposed washers positioned in said washer feeding means, grasping the uppermost superimposed washers, and removing the uppermost superimposed washers in succesisve periods in response to the detected presence of superimposed washers within said washer feeding means.

21. The method of conveying a plurality of washers carried in spaced-apart locations by a washer feeding means comprising the steps of detecting the presence or absence of superimposed washers within said washer feeding means, grasping the uppermost superimposed washers, and removing the uppermost superimposed washers in response to the detected presence of superimposed washers within said washer feeding means.

References Cited by the Examiner
UNITED STATES PATENTS

| | | | |
|---|---|---|---|
| 2,343,798 | 3/1944 | Poupitch | 10—155 |
| 3,065,841 | 11/1962 | Stover | 221—212 X |
| 3,067,852 | 12/1962 | Barr | 221—212 X |

WILLIAM W. DYER, JR., *Primary Examiner.*